C. E. HENRIOD.

FOUR-PHASE, SINGLE PISTON, VALVELESS MOTOR.

APPLICATION FILED MAR. 14, 1913.

Reissued Aug. 19, 1913. 13,607.

*Witnesses:*

Victor Marrau

Edmond Levantarick

*Inventor:*

Charles Edouard Henriod

UNITED STATES PATENT OFFICE.

CHARLES EDOUARD HENRIOD, OF NEUILLY-SUR-SEINE, FRANCE, ASSIGNOR TO SOCIÉTÉ RIBEYROLLES & CIE., OF PUTEAUX, SEINE, FRANCE.

FOUR-PHASE, SINGLE-PISTON, VALVELESS MOTOR.

13,607. Specification of Reissued Letters Patent. Reissued Aug. 19, 1913.

Original No. 1,029,192, dated June 11, 1912, Serial No. 639,585. Application for reissue filed March 14, 1913. Serial No. 754,[illegible].

*To all whom it may concern:*

Be it known that I, CHARLES EDOUARD HENRIOD, a citizen of the Republic of France, and resident of 117 Avenue du Roule, Neuilly-sur-Seine, Seine, France, have invented a Four-Phase, Single-Piston, Valveless Motor, of which the following is a specification.

The four-phase, valveless motor, to which the present patent relates, is characterized by the combination of channels cut in the piston itself, with other channels or grooves cut in an outer rotating part, in such a manner as to isolate the bottom of the cylinder during the compression and explosion phases, to bring it into communication with the carbureter only during the admission phase, and with the atmosphere only during the exhaust phase. To this end, the herein illustrated arrangement in which the piston undergoes during its stroke a rotary movement around its axis (Figure 1), and a modification in which this movement is dispensed with.

Figure 1:
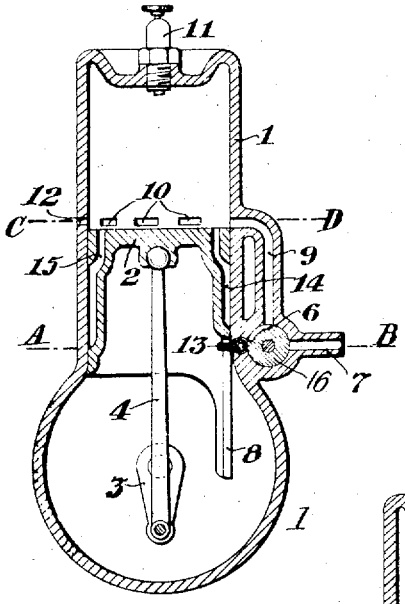
Figure 2:
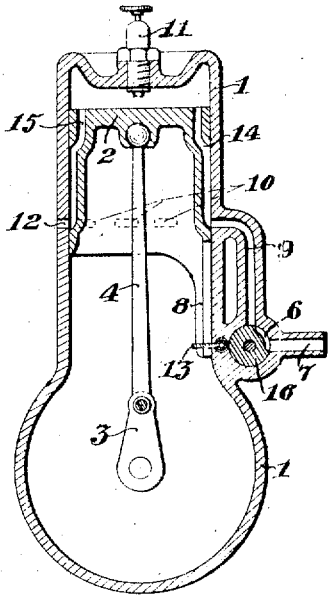
Figure 5:
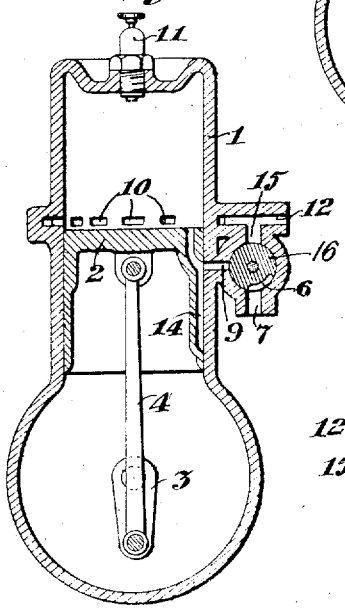
Figure 3:
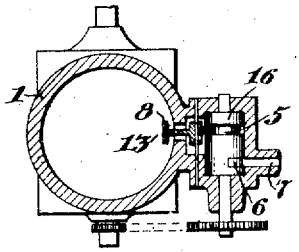
Figure 4:
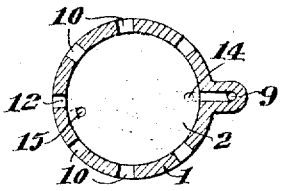
Figure 6:
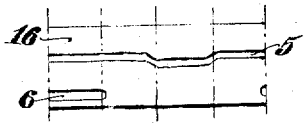

In the annexed drawings: Fig. 1 is a vertical central sectional view of one form of the motor, showing the piston at the end of the stroke. Fig. 2 is a similar view showing the piston at the commencement of the stroke. Fig. 3 shows a horizontal section taken on the line A—B Fig. 1. Fig. 4 shows a horizontal section taken on the line C—D, Fig. 1. Fig. 5 shows a vertical section of another modification with the piston at the end of the stroke. Fig. 6 is a development of the part 16, showing the grooves 5 and 6.

Referring to Figs. 1 to 4, 1 designates the cylinder; 2, piston; 3, driving crank; 4, piston rod; 5, one of the grooves of the part 16; 6, another groove cut in 16; 7, inlet pipe; 8, extension of the piston provided with a groove; 9, communication channel between 7 and 14; 10 opening in the cylinder; 11, sparker; 12, outlet for the spent gases; 13, peg actuated by 5; 14, channel cut in the piston; 15 exhaust channel; 16, distributer or device for controlling the inlet of gas.

In the preferred arrangement (shown in Figs. 1 to 4 of the drawings,) the piston 2 has an extension 8 provided with a groove into which engages a peg 13 actuated by the special groove 5; the function of which groove 5 is to move the peg 13 slightly from right to left, or vice versa, so as to give the piston a slightly rotary movement around its axis, the effect of which is to produce or to prevent communication of the channel 14 with 9 and of channels 15 with openings 12. The piston 2 is, in fact, provided with one or more channels 15 which can be brought in front of openings 12. I denominate as openings 12 those chosen from among the openings 10 made in the cylinder expressly to correspond with channels 15. The channel 9 may be brought into communication with the channel 7 (inlet of the gaseous mixture) by means of a groove 6, cut in the part 16 the construction and motion of which are so calculated that the communication between 7 and 9 is only established during the suction phase.

I have given the number 16 to the part in which the grooves 5 and 6 are cut, and to which rotary motion is communicated by the driving crank of the motor; this part, which rotates at half the speed of that of the shaft of the motor, is driven directly by a set of gearing having a relation of 1 to 2.

The form of groove 5 is so cut that communication between 12 and 15 is only established during the exhaust phase. The operation of this form of the invention is therefore as follows: During the entire phase of aspiration (1st phase), the piston descending, the groove 6 is open, that is to say it allows free communication between 7 and 9, and the groove 5 has given to the piston a position which allows 14 to communicate with 9. On reaching the end of the stroke (Fig. 1) the groove 6 has continued its movement, as well as groove 5; communication between 7 and 9 is closed. The piston is about to rise again to effect the compression (2nd phase), the grooves 5 and 6 continuing their rotary movement. During this phase, communication remains closed between 7 and 9. The sparking takes place at this moment, and the explosion is produced (3rd phase), during which 7, 9 and 14 retain the same position as during the compression. Finally, the piston, in its upward movement, forces the spent gases to escape (4th phase). It will have been clearly understood that the spent gases commence to escape when, at the end of the third phase (explosion), the openings 10 are uncovered. But practice shows that the exhaustion of the gases thus effected is not sufficiently complete. The piston, on rising again, therefore forces all the remaining gases to escape by the channel or channels 15, which is or are placed in communication with openings 12 by means of groove 5, which has caused the piston to rotate. During this time, the groove 6 has continued its rotation, but has not yet opened up communication between 7 and 9. This communication will only be established during the succeeding phase, that is to say during the first phase of the second cycle, and the operations continue in the same order, communication between 7 and 9 only being established once (aspiration) during the entire duration of a cycle.

Operation: 1st phase (suction): 6 places in communication 7 and 14, *i. e.* the carbureter with the bottom of the cylinder. 2nd phase (compression). For these two phases, 6 has rotated and 3rd phase (explosion) the part 16 completely obstructs the channel 9. 4th phase (exhaustion). The part 16 presents the groove 6 in such a position that the channel 14 is brought into communication with 15 and 12.

In the modification shown by Fig. 5 oscillatory motion of the piston is avoided. In this construction the groove 5 is omitted and 6 is so located in 16 that, during the suction phase 6 places 7 in communicating with 9 and 14, while during the exhausting phase, 6 places 12 in communication with 9 and 14.

I claim:

1. In a four cycle explosion motor, the combination with a cylinder provided with orifices capable of communicating with the exterior either for the admission of fresh gases or for the expulsion of burned gases, a rotary sliding piston, having channels for establishing communication with said orifices, according to the position of said piston, a rotary distributer adapted to admit gas into said cylinder through one of said piston channels and one of said orifices during the suction stroke, a prolongation in said piston having a groove, and a finger riding in said groove, and controlled by said rotary distributer to rotate said piston, the relation between said piston and distributer being such that during the compression and explosion periods said piston covers the orifice leading to said distributer at the same time that the rotary distributer interrupts the admission of the fresh gas, whereby all communication is cut off between the carbureter and the cylinder during said compression and explosion periods.

2. In a four-cycle explosion motor, the combination of a cylinder 1, provided with orifices 10, 12 and 9 capable of communicating with the exterior, either for the admission of fresh gases, or for the exhaustion of a part of the burned gases, a piston 2, with a channel 14, sliding in the cylinder, closing by means of the base, in an upward movement, the channel 9 which leads to the distributer; a rotary distributer 16 with a groove 6 capable of placing the fresh gas admission channel 7 in communication with the interior of the cylinder, during the suction period, by means of the channels 9 and 14 arranged in the cylinder, the groove 6 also placing the interior of the cylinder in communication with the exterior through the channels 14, 9, 15 and 12 during the period of expulsion of the burned gases; said sliding piston 2 and said rotary distributer 16 being so related that during the compression and explosion periods the piston covers the channel 9 leading to the distributer, at the same time as the rotary distributer interrupts the communication between the channel 9 and the fresh gas admission channel 7, in such manner that all communication is cut off between the carbureter and the interior of the cylinder during the compression and explosion periods.

In testimony whereof I affix my signature in presence of two witnesses.

CHARLES EDOUARD HENRIOD.

Witnesses:
VICTOR MATEAU,
LUCIEN MEMMINGER.